United States Patent Office 3,433,807
Patented Mar. 18, 1969

3,433,807
AMINOPROPOXYMETHYLFURANS AND INTERMEDIATES THEREFOR
Robert E. Jones, North Muskegon, Mich., and Samuel A. Robinson, Plainfield, N.J., assignors to Merck & Co., Inc., Rahway, N.J., a corporation of New Jersey
No Drawing. Filed Sept. 26, 1963, Ser. No. 311,670
U.S. Cl. 260—347.7                                12 Claims
Int. Cl. C07d 5/04, 5/20

This invention relates to derivatives of 5-hydroxymethylfurfuryl alcohol and 5-hydroxymethyl tetrahydrofurfuryl alcohol, and more particularly to cyanoethylated and aminopropylated derivatives thereof. Specifically it relates to the production of novel monoamines and diamines derived from novel monocyanoethoxy- and dicyanoethoxyfurfuryl alcohols and tetrahydrofurfuryl alcohols.

The novel compounds which the present invention contemplates are those represented structurally below.

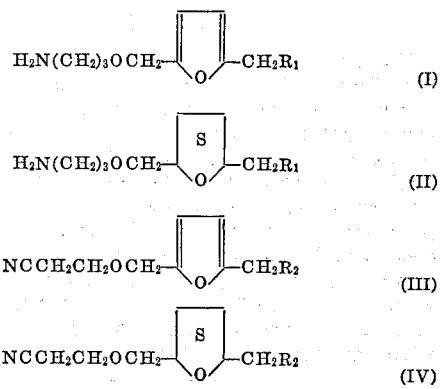

where $R_1$ is hydroxyl, amino or γ-aminopropoxy, and $R_2$ is hydroxy or β-cyanoethoxy.

Compounds I and II are the end products of the invention and are typified respectively by 2,5-bis(γ-aminopropoxymethyl)furan, 2 - hydroxymethyl - 5-(γ-aminopropoxymethyl-furan), 2 - aminomethyl - 5-(γ-aminopropoxymethyl-furan); and 2,5 - bis - (γ-aminopropoxymethyl)tetrahydrofuran, 2 - hydroxymethyl - 5-(γ-aminopropoxymethyl)tetrahydrofuran and 2-aminomethyl-5-(γ-aminopropoxymethyl)tetrahydrofuran. The bis compounds are the preferred ones. Compounds III and IV are intermediates in the preparation of Compounds I and II and are represented respectively by 2,5-bis(β-cyanoethoxymethyl)furan, 2 - hydroxymethyl - 5 - (β-cyanoethoxymethyl)furan; and 2,5-bis-(β-cyanoethoxymethyl)tetrahydrofuran, and 2 - hydroxymethyl - 5 - (β-cyanoethoxymethyl)tetrahydrofuran. The bis-cyano compounds are preferred.

Compounds III and IV are prepared by reacting 2,5-dimethanolfuran or 2,5-dimethanoltetrahydrofuran depending on whether the saturated or unsaturated compound is sought, with acrylonitrile in the presence of a strong base, preferably, though not necessarily, in the presence of a solvent. As suitable solvents there may be mentioned dioxane, xylene, butyl acetate, benzonitrile, and pyridine. The reaction is carried out at temperatures ranging from 25° C. to reflux temperature of the system. Suitable results are obtained at temperatures in the range of 65–85° and this is preferred. Under such conditions the reaction is normally complete in from ½ to 6 hours.

With respect to the amount of reagents used, when the bis-cyano compounds are desired it is preferred to use an excess of acrylonitrile over the stoichiometric amount required for reaction between the acrylonitrile and the hydroxymethyl substituents. In this regard anything less than a two-to-one mole ratio of acrylonitrile to starting material will result in the formation of varying amounts of the bis-cyano compound and the monocyano compound, the latter of which, upon subsequent treatment, hereinafter recited, will yield the corresponding monoamine.

Representative of the strong base that may be used to catalyze the reaction are alkali metal alkoxides such as sodium and potassium methoxide and sodium and potassium ethoxide, hydrides, cyanides and quaternary ammonium hydroxides and the like with sodium methoxide being preferred. The amount of catalyst used is not critical and is preferably in the range of from 0.1 to 5.0 weight percent, based on the amount of hydroxymethyl starting material used.

As a result of the foregoing description the compounds are obtained as liquids in the reaction mass and may be separated therefrom by fractional distillation as will be apparent from the examples appearing hereinafter.

The amines represented by Formulas I and II above are obtained from Compounds III and IV by submitting these latter compounds to reductive amination. This is achieved by treating the cyano compounds with hydrogen, with or without ammonia as will be discussed hereafter, and in the presence of a suitable catalyst. The reaction is suitably carried out at a temperature in the range of from 100° C. to about 300° C. and under a hydrogen pressure in the range of from 200 p.s.i. to 10,000 p.s.i. The presence of ammonia is necessary when $R_2$ is —OH and amination of this group is desired. Under such circumstances higher temperatures of reaction of the order of 250–300° C. are indicated. When amination of the —OH group is not desired, the β-cyano group may be reduced to the amine without the added use of ammonia, although it is preferred to use an amount of ammonia in the system to reduce potential side reactions. Under these circumstances lower reaction conditions, of the order of 100–200° C. are suitable. The amount of ammonia used under such conditions is suitably from 1 to 10 moles/mole, based on the starting material. It will be appreciated by those skilled in the art that when starting with the unsaturated furan compounds, the hydrogenation must be controlled to achieve reduction of the cyano groups with a minimum saturation of the furan ring itself. This may be achieved by controlling the amount of hydrogen introduced into the hydrogenation apparatus as is well known.

The catalyst employed may be any suitable hydrogenation catalyst, Raney nickel being preferred.

As a result of this step the final Compounds I and II are obtained as high boiling liquids, recovered by vacuum distillation or molecular distillation. They are useful as cross-linking agents in the epoxy resin field and can generally be used in the formation of other resins. Example 3, appearing hereafter, demonstrates the utility for the compounds.

The following examples are given for purposes of illustration only and are not intended to limit the scope of the invention. Unless otherwise indicated all parts are parts by weight.

EXAMPLE 1

2,5-bis(β-cyanoethoxymethyl)furan 31.8 g. acrylonitrile (39.4 ml.; 0.6 moles), 0.9 g. sodium methoxide, suspended in dioxane (peroxide free), and 19.2 g. furan-2,5-dimethanol (0.15 moles) are warmed to 74–76° C. while stirring in a round bottom flask fitted with a reflux condenser. Then 42 ml. acrylonitrile (34.1 g.; 0.645 moles) are added so as to keep the temperature at 74–76° C. with occasional cooling in ice water. The dark reaction mixture is aged at 74–76° C. for 6 hours and at room temperature for 18 hours.

The excess acrylonitrile and the solvent are removed under vacuum, and the residual oil is quenched into 100 ml. water and 100 ml. chloroform. This system is then acidified to pH 5.5–6.0 with 1.8 ml. 2.5 N. hydrochloric acid (pH meter). A small amount of mushy material is filtered, washed with chloroform and water. The filtrate is separated, and the aqueous layer is extracted with 3 × 25 ml. of chloroform. The combined organic layers are washed with 3 × 25 ml. of water, stirred with anhydrous sodium sulfate and 5 g. charcoal, filtered, the cake washed with chloroform, and all solvent removed under vacuum on the steam bath, yielding the liquid product, 2,5-bis(β-cyanoethoxymethyl)furan.

Yield=36.4 g. red-orange liquid (~100%)
$n_D^{25} = 1.4900$
I.R.=weak hydroxyl; strong nitrile, ether ring
U.V.=E percent 4.6 at 2500, E percent 78.6 at 2230.
*Analysis.*—Calc'd: C, 61.6%; H, 5.98%; N, 119.6%.
Found: C, 61.20%; H, 6.24%; N, 13.20.

Similar results are obtained when sodium ethoxide is employed in place of the sodium methoxide in the foregoing procedure.

EXAMPLE 2

2,5-bis(γ-aminopropoxymethyl)furan

The compound is Example 1, 2,5-bis(β-cyanoethoxymethyl)furan (one part) is subjected to reductive amination with liquid ammonia (three parts) under a hydrogen pressure of about 2000 p.s.i. at 150° C. and with a Raney nickel catalyst (0.1 part) to form 2,5-bis(γ-aminopropoxymethyl)furan.

EXAMPLE 3

To 3.1 g. of the diamine obtained from Example 2 is added 10 gm. of an epoxide (Epon 828, Shell Chemical Corp.), of the following structure:

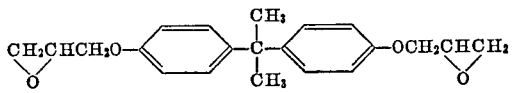

and the mixture cured at room temperature for 20 hours. This results in a partially cured resin which, upon further curing for six hours at 100° C., results in a tough product having a Barcol hardness of 16.

EXAMPLE 4

2,5-bis(β-cyanoethoxymethyl)tetrahydrofuran 21.9 g. tetrahydrofuran-2,5-dimethanol (0.166 mole) and 1.1 g. fresh sodium methoxide suspended in 100 ml. dioxane (peroxide free) are warmed to 74–76° C. while stirring in a round bottom flask fitted with a reflux condenser. Then 42 ml. acrylonitrile (34.1 g.; 0.645 mole) are added so as to keep temperature at 74–76° C. with occasional cooling in ice water. The resulting dark reaction mixture is aged at 74–76° C. for 6 hours, and at room temperature for 18 hours.

The excess acrylonitrile and the solvent are removed under vacuum, and the residual oil is quenched into 100 ml. of water and 100 ml. of chloroform. This system is then acidified to a pH of from 5.5–6.0 with 1.8 ml. of 2.5 N. hydrochloric acid. The pH is measured with a pH meter. A small amount of mushy material is filtered, washed with chloroform and water. The filtrate is separated, and the aqueous layer is extracted with 3 × 25 ml. of chloroform. The combined organic layers are washed with 3 × 25 ml. of water, stirred, with anhydrous sodium sulfate and 5 g. Nuchar ClOOON, filtered, the cake is washed with chloroform, and all solvent is removed under vacuum on a steam bath, yielding the liquid product, 2,5 - bis(β-cyanoethoxymethyl)tetrahydrofuran. This is purified in 10 volumes of a mixed solvent of 50% ethyl acetate-ethyl ether over 10× its weight of neutral alumina.

Recovery=8.8 g. (88% recovery)
$n_D^{25} = 1.4626$
*Analysis.*—Calc'd: C, 60.45%; H, 7.56%; N, 11.78%.
Found: C, 60.82%; H, 7.62%; N, 11.89%.

EXAMPLE 5

Following the procedure of Examples 1 and 4 but using one-half the amount of acrylonitrile the compounds 2-hydroxymethyl-5-(β-cyanoethoxymethyl)furan and 2-hydroxymethyl-5-(β-cyanoethoxymethyl)tetrahydrofuran are obtained respectively.

EXAMPLE 6

One part of each of 2,5-bis(cyanoethoxymethyl)tetrahydrofuran and 2-hydroxymethyl-5-(β-cyanoethoxymethyl)tetrahydrofuran are treated individually with 4 parts liquid ammonia under hydrogen pressure of about 2000 p.s.i. at 150° C. in the presence of 0.2 part of Raney nickel catalyst, thereby yielding 2,5-bis(γ-aminopropoxymethyl)-tetrahydrofuran and 2-hydroxymethyl-5-(γ-aminopropoxymethyl)tetrahydrofuran. These products are recovered by molecular distillation at 10 microns pressure.

When the foregoing procedure is repeated at 250° C., 2 - aminomethyl - 5 - (γ - aminopropoxymethyl)tetrahydrofuran is obtained from 2-hydroxymethyl-5-(β-cyanoethoxymethyl)tetrahydrofuran.

EXAMPLE 7

When the diamines obtained from Example 6 are separately mixed with 10 grams of an epoxide as in Example 3 (3 g. of amine per 10 g. of epoxide) and the resulting resins cured as in that example, there is obtained from the bis-(amine) a product having a Barcol hardness of 16, and a product from the other diamine having a Barcol hardness of 6.

It will be apparent to those skilled in the art that a wide variety of combinations and variations may be employed in preparing the compositions of the present invention without departing from the spirit and scope of the invention. All such modifications, changes and variations, departing from the above description are intended to be encompassed within the scope of the appended claims.

What is claimed is:

1. A compound selected from the group consisting of

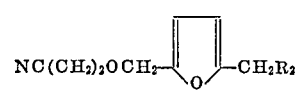

and

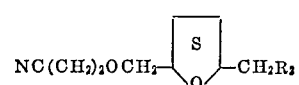

where $R_2$ is selected from the group consisting of β-cyanoethoxy and hydroxy.

2. 2,5-bis(β-cyanoethoxymethyl)furan.
3. 2,5-bis(β-cyanoethoxymethyl)tetrahydrofuran.
4. 2-hydroxymethyl-5-(β-cyanoethoxymethyl)furan.
5. 2 - hydroxymethyl - 5 - (β-cyanoethoxymethyl)tetrahydrofuran.
6. A compound selected from the group consisting of

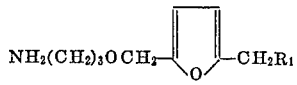

and

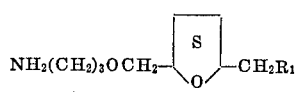

where $R_1$ is selected from the group consisting of γ-aminopropoxy, hydroxy and amino.

7. 2,5-bis(γ-aminopropoxymethyl)furan.
8. 2,5-bis(γ-aminopropoxymethyl)tetrahydrofuran.
9. 2 - aminomethyl - 5 - (γ - aminopropoxymethyl) tetrahydrofuran.
10. 2-aminomethyl-5-(γ-aminopropoxymethyl)furan.
11. 2 - hydroxymethyl - 5 - (γ - aminopropoxymethyl) furan.
12. 2 - hydroxymethyl - 5 - (γ - aminopropoxymethyl) tetrahydrofuran.

References Cited
UNITED STATES PATENTS

| | | | |
|---|---|---|---|
| 2,280,792 | 4/1942 | Bruson | 260—347.8 |
| 3,076,819 | 2/1963 | Heise | 260—347.7 |

HENRY L. JILES, *Primary Examiner.*

JAMES H. TURNIPSEED, *Assistant Examiner.*

U.S. Cl. X.R.

260—47, 347.8